Aug. 18, 1931.  L. H. FRY ET AL  1,819,887
CROSSHEAD
Filed March 15, 1930  2 Sheets-Sheet 1
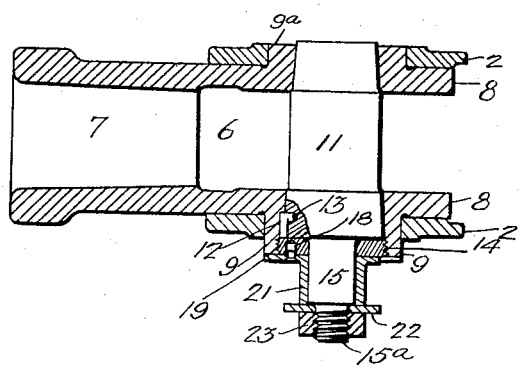
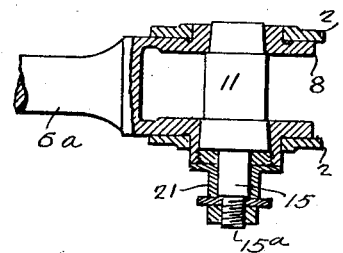
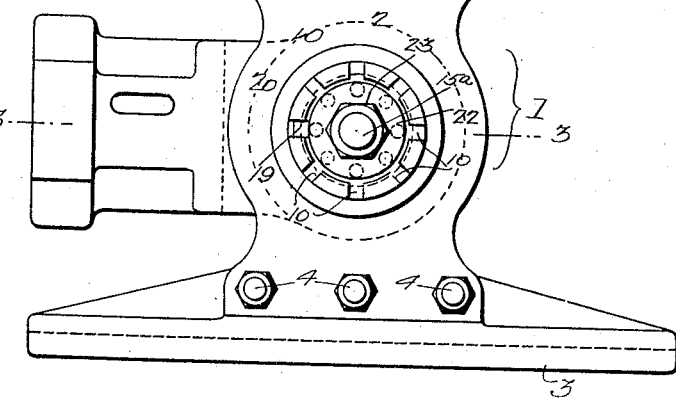
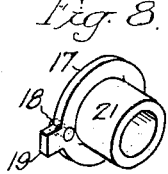
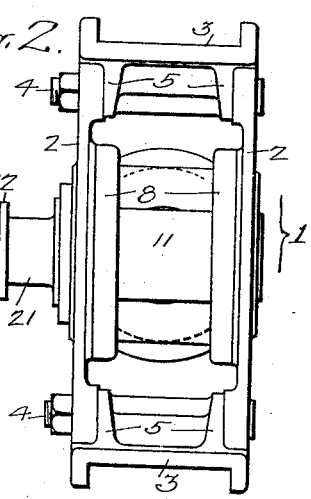
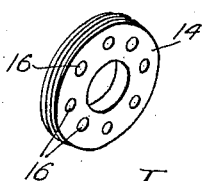
Inventors
Lawford H. Fry
Ellwood M. Shannon
by their Attorneys

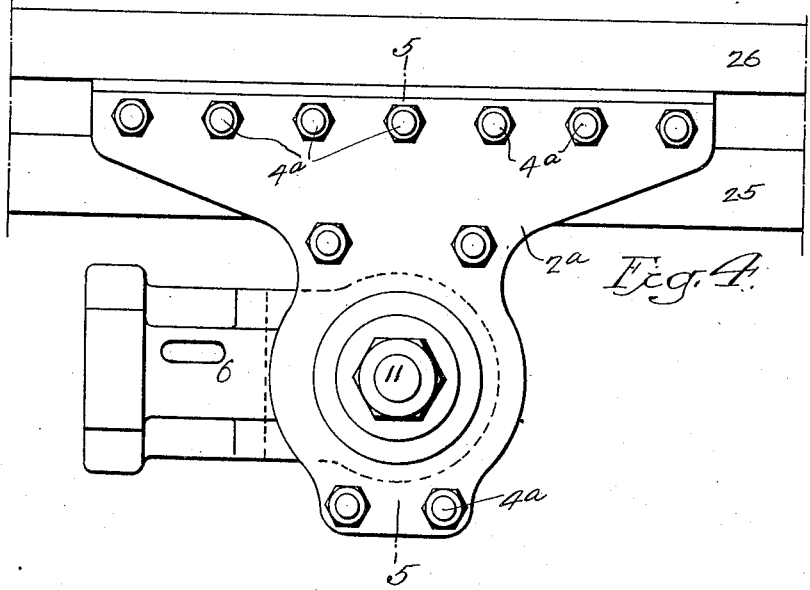
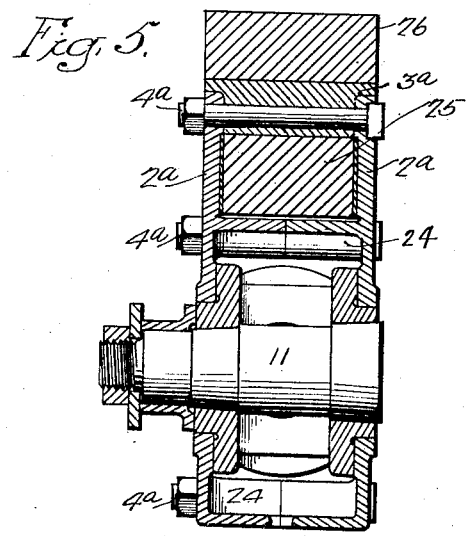
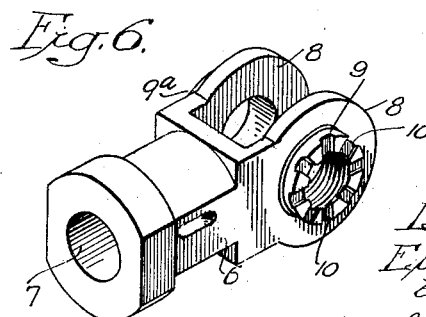

Patented Aug. 18, 1931

1,819,887

UNITED STATES PATENT OFFICE

LAWFORD H. FRY, OF BURNHAM, AND ELLWOOD M. SHANNON, OF BALA, PENNSYLVANIA

CROSSHEAD

Application filed March 15, 1930. Serial No. 436,207.

Our invention relates to certain improvements in cross-heads, particularly the cross-heads of locomotives.

The object of our invention is to provide a hinged joint between the piston rod and the main cross-head, so that there will be a flexible connection between the two which will relieve the piston rod connection of any stress which would be set up if the guides and cylinder were not on the same level.

In the accompanying drawings,—

Fig. 1 is a side view of a cross-head having two gibs;

Fig. 2 is an end view of the cross-head shown in Fig. 1;

Fig. 3 is a sectional view on the line 3—3, Fig. 1;

Fig. 4 is a side view of a cross-head having a single gib;

Fig. 5 is a sectional view on the line 5—5, Fig. 4;

Fig. 6 is a detached perspective view of the knuckle member of the cross-head;

Figs. 7, 8 and 9 are views of details of the invention; and

Fig. 10 is a view showing knuckle members made integral with the rod.

1 is the body of the cross-head, consisting of two plates 2—2, which are secured to the two gibs 3—3, by transversing bolts 4. The gibs 3 have inwardly projecting flanges 5, against which the plates 2 are secured, the bolts passing through the openings in the gibs, as well as through the plates. Located between the two plates is a knuckle member 6, having an opening 7 at one end, in which is secured the piston rod. The knuckle member is forked as shown and two side members 8 are fitted against the two plates 2—2. One side member 8 has trunnion 9 and the other side member has trunnion 9a which extend through openings in the plates 2, and there are bearings in said openings. The trunnion 9 is of greater length than the trunnion 9a and has a series of notches 10 in its outer end for the purpose described hereinafter.

11 is the wrist-pin which extends through the knuckle member 6. The openings in both members 8 of the knuckle member are tapered and the wrist-pin has tapered sections located in the openings as shown in Fig. 3. The connecting rod is mounted on this wrist-pin. The pin is locked from turning in the trunnion 9 by a key 12, which is located in a groove in the wrist-pin and a like groove in the trunnion, and this wrist-pin has a right angle projection 13, which extends into a notch in the wrist-pin, preventing the key being withdrawn independently of the wrist-pin 11.

14 is a screw-plug having an opening for the stem 15 of the wrist-pin 11, and this screw-plug has threads on its periphery adapted to the internal threads on the trunnion 9, and in the screw-plug are a series of holes 16, Fig. 7, and on the flange 17 of a sleeve 21 is a pin 18 which is arranged to enter any one of the holes 16. Projecting from the flange 17 of the sleeve is a lug 19 adapted to enter any one of the notches 10 in the end of the trunnion 9. By this means the flange 17 is locked to the trunnion, and the screw-plug is locked also to the washer. A washer 22 is located at the outer end of the sleeve, and both the sleeve and the washer are held in position on the stem 15 of the plug by a nut 23, which is screwed onto the threaded end 15a of the stem. In some instances the flange 17 may be made separate from the sleeve 21 if desired. The gibs 3 are grooved as shown in Fig. 2, so as to fit the slideways of the locomotive or other engine.

By this construction it will be seen that the knuckle member of the cross-head, which is secured to the outer end of the piston rod, is pivotally connected to the cross-head so that the cross-head and the knuckle member will adjust themselves to any inequalities, and thus the piston rod will be relieved of any stress which is objectionable when a rigid type of cross-head is used. It has been found that when the conventional rigid type cross-head is used, a considerable number of piston rods fail because the bending stresses in service cause the fit of the rod in the cross-head to loosen and the rod to work in the cross-head, but by pivoting the members as described above, vertical bending stress will be eliminated and the piston rod failures should be reduced.

In Fig. 4 we have illustrated the invention in connection with the piston rod of the single gib type.

In Fig. 5 the side plates 2a are clamped to the knuckles by means of bolts 4a through bosses 24, parted on the center line of the cross-head. The gib 3a extends between the lower member 25 of the slideway and the upper member 26 shown in Fig. 5 and is held firmly between the side plates.

In some instances the knuckle member 6 may be made integral with the piston rod 6a as in Fig. 10, without departing from the main features of the invention.

We claim:

1. The combination in a cross-head, of a body portion having gibs secured thereto; a knuckle member having trunnions pivotally mounted in the body portion; and a wrist-pin extending through the knuckle member.

2. The combination in a cross-head, of a body portion consisting of two plates spaced apart, each plate having a bearing therein; gibs secured to the plates; and a knuckle member located between the said plates and having trunnions, each plate having a bearing for a trunnion, said knuckle being attached to a piston rod.

3. The combination in a cross-head, of a body portion consisting of two plates spaced apart; a gib secured to the plates, said plates having bearings; a knuckle member arranged to be attached to a piston rod and located between the plates, said knuckle member having trunnions mounted in the bearings of the plates; and a wrist-pin extending through the knuckle member.

4. The combination in a cross-head, of two plates spaced apart; two gibs having projections located between the plates; bolts securing the gibs to the plates, each plate having a bearing; a knuckle member arranged to be secured to a piston rod and having trunnions mounted in the bearings of the plates; openings in the knuckle member; a wrist-pin located in the openings; and means for securing the wrist-pin in position.

5. The combination in a cross-head, of a body portion consisting of two plates spaced apart; a gib secured to the plates; a knuckle member adapted to be secured to the piston rod and having trunnions mounted in the plates; a wrist-pin mounted in openings in the knuckle member; a screw-plug adapted to a threaded opening in one trunnion for the wrist-pin; a key locking the wrist-pin to the knuckle member; and a sleeve having a projection, the screw-plug having a series of holes into any one of which the projection may enter, the sleeve also having a lug, and the trunnion of the knuckle member having notches into any one of which the lug may extend, so that when the parts are in position the wrist-pin will be locked to the knuckle member.

6. The combination in a cross-head, of two plates spaced apart; a gib located between the plates; bolts securing the plates together and to the cross-head, each plate having a bearing; a knuckle member arranged to be secured to a piston rod and having a forked end, each fork having a trunnion adapted to the bearing in each plate and having a tapered opening therein; a wrist-pin extending through the forked ends of the knuckle member, and having tapered portions adapted to the tapered openings in the forks; a sleeve on the end of the wrist-pin, the wrist-pin being threaded at its outer end; and a nut on the threaded end of the wrist-pin for locking the sleeve and washer in position.

LAWFORD H. FRY.
ELLWOOD M. SHANNON.